Sept. 9, 1941.　　　M. F. MILLER　　　2,255,360
INSECT DESTROYER
Filed Jan. 12, 1940

INVENTOR.
Milo F. Miller
BY
ATTORNEYS

Patented Sept. 9, 1941

2,255,360

UNITED STATES PATENT OFFICE 2,255,360

INSECT DESTROYER

Milo F. Miller, Kansas City, Mo.

Application January 12, 1940, Serial No. 313,574

5 Claims. (Cl. 43—121)

This invention relates to insect destroyers of the type having means for collecting the insects after the same have been killed or rendered inactive by poisonous substances carried by a unique holder disposed with respect to the collector so that the destroyed insects will fall by gravity to a point where the same are concealed from view.

One of the important objects of this invention is to provide an insect destroyer that has a holder for insecticide, which is specially formed so as to preclude access to the insecticide by those for which it is not intended.

This invention has for another aim the provision of an insecticide destroyer, the parts of which are removably associated with each other so that the insecticide holder may be removed from time-to-time and further, so that the base forming means for collecting the insects may be conveniently emptied.

Specific details of construction embodying further objects of this invention will be described during the following specification, referring to the accompanying drawing wherein.

Figure 1:
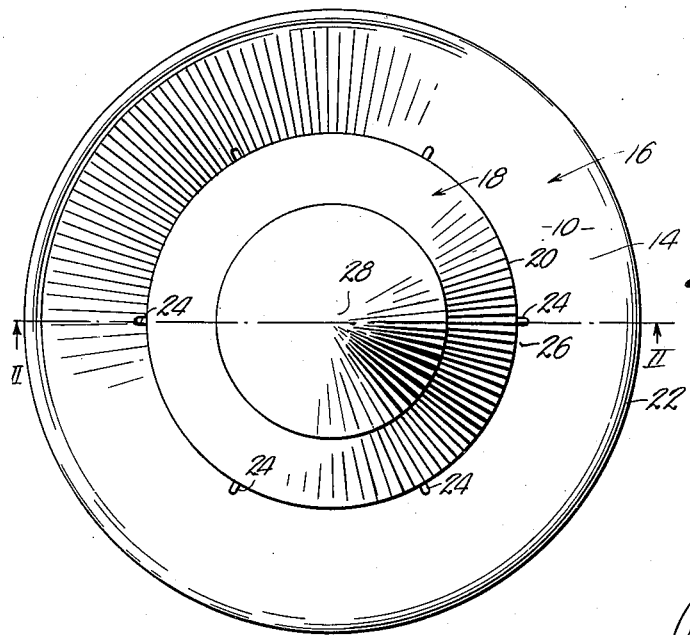
Figure 1 is a top plan view of an insect destroyer made in accordance with the present invention.

A holder base 6, in the instance illustrated is in the form of a pan-like device, relatively shallow, and having an upstanding, outwardly inclined side wall 8, the upper edge of which supports the specially formed cover that is generally designated by the numeral 10. Cover 10 comprises a plurality of members, each of which has an inclined face for the purpose of directing the destroyed insects into hollow base 6.

Cover 10 has an opening 12 formed in section 14 which is downwardly and inwardly inclined to present a face 16, upon which the destroyed insects may fall when leaving inclined face 18 of section 20.

Section 16 has a knurled annular edge 22 that rests upon the free edge of wall 8. Section 20 is conical with the base thereof adjacent to section 16, and of a diameter great enough to extend beyond the edges of section 16 forming opening 12. Spacing elements 24 are arranged so that an opening 26 is established between sections 16 and 20. This opening 26 is below the uppermost edge of section 16 and is intermediate the upper and lower edges of said section 16 so that the direction of travel of the destroyed insects is changed and further to preclude a casual observer from seeing directly into hollow base 6 where the destroyed insects are collected.

An insecticide holder 28 of special character is mounted above cover 10 and provided with a plurality of recesses 30 that extend upwardly from the lower side of holder 28. Holder 28 in the instance illustrated, is conical and made from a solid piece of material having recesses 30 formed in the underside thereof. Such a specific type of holder 28 need not be made to create an insecticide destroyer to embody this invention.

Holder 28 may be of any form so long as it has recesses of a size great enough to permit the insects to be destroyed, to enter the same and so long as the recesses are small enough to preclude accidental access to the insecticide 32, which is stored in the lowermost portions of recesses 30.

Figure 3:
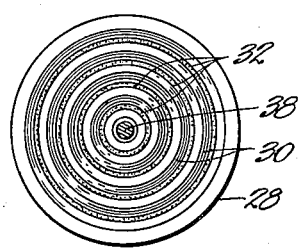
Fig. 3 is a sectional view taken on line III—III of Fig. 2, looking in the direction of the arrows.
Figure 2:
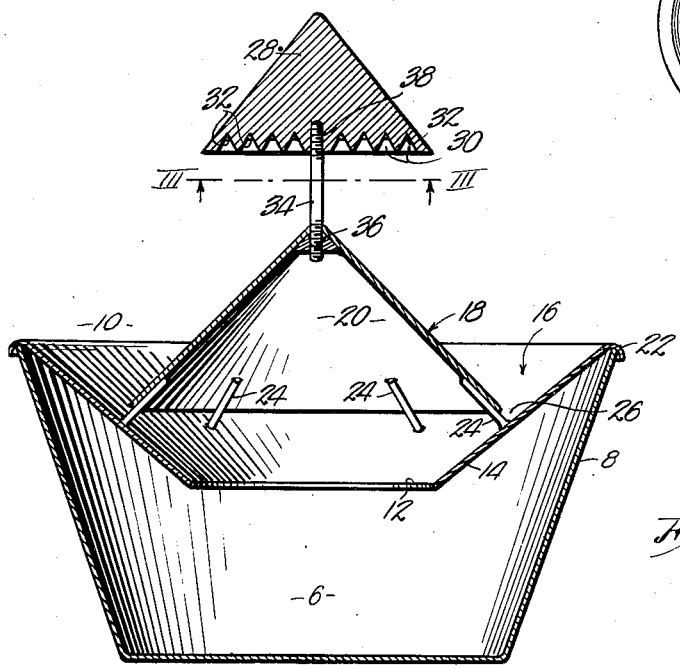
Fig. 2 is a vertical central sectional view through the device.

It is preferred to have recesses 30 progressively decrease in size as their lower portions are approached and when the same are made as illustrated in Figs. 2 and 3, it will be impossible for children or unauthorized persons to accidentally wipe insecticide 32 from its operative position. Insects intended to be destroyed can easily enter recesses 30 to eat the insecticide 32.

Holder 28 is removably mounted upon cover 10 through the medium of stem 34, the ends of which are screw-threaded to engage respectively the tapped openings 36 and 38 in members 20 and 28 respectively. Thus, holder 28 may be renewed with ease and where a different type of insecticide is to be used in destroying particular kinds of insects, the holder having the proper insecticide may be placed.

From the foregoing description, it will be apparent to one skilled in the art that the concepts of this invention might be embodied in insect destroyers having physical characteristics other than those illustrated in the drawing and therefore, it is desired to be limited only by the scope of the appended claims.

Having thus described the invention, what is claimed as new and desired to be secured by Letters Patent is:

1. An insect destroyer comprising a hollow base wherein to collect the destroyed insects; an insecticide holder carried by the base; and means for directing insects into the hollow base after the same have been destroyed by the insecticide, said insecticide holder having a downwardly facing side and plurality of recesses formed inwardly from said side thereof.

2. An insect destroyer comprising a hollow base wherein to collect the destroyed insects; an insecticide holder carried by the base; and means for directing insects into the hollow base after the same have been destroyed by the insecticide, said insecticide holder having a plurality of recesses formed inwardly from one side thereof, said recesses being large enough for the entrance of certain insects to be destroyed and small enough to preclude the entrance of fingers of the hands of those handling the holder.

3. An insect destroyer comprising a hollow base wherein to collect the destroyed insects; an insecticide holder carried by the base; and means for directing insects into the hollow base after the same have been destroyed by the insecticide, said insecticide holder having a plurality of recesses formed inwardly from one side thereof, the insecticide being at the bottom of the recesses to preclude access thereto by those other than insects intended to be destroyed.

4. An insecticide destroyer comprising a hollow base wherein to collect the destroyed insects; an insecticide holder above the base provided with recesses extending upwardly and inwardly from the lowermost face thereof; and insecticide in the recesses at the innermost portions thereof.

5. An insecticide destroyer comprising a hollow base wherein to collect the destroyed insects; a cover for the base provided with an opening therethrough for the entrance of destroyed insects and an inclined face for directing the said insects toward the opening; a holder mounted on the cover above the base having a plurality of recesses formed inwardly from the lowermost face thereof; and insecticide at the innermost portions of the recesses.

MILO F. MILLER.